United States Patent
Kim et al.

(10) Patent No.: US 10,547,031 B2
(45) Date of Patent: Jan. 28, 2020

(54) PROTECTION TAPE AND SECONDARY BATTERY HAVING THE SAME

(75) Inventors: Andy Kim, Suwon-si (KR); Gu-Young Choi, Suwon-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1028 days.

(21) Appl. No.: 12/957,083

(22) Filed: Nov. 30, 2010

(65) Prior Publication Data

US 2011/0129728 A1    Jun. 2, 2011

(30) Foreign Application Priority Data

Nov. 30, 2009 (KR) .................. 10-2009-0116673

(51) Int. Cl.
*H01M 2/08* (2006.01)
*B32B 3/10* (2006.01)
*B32B 3/30* (2006.01)
*H01M 2/02* (2006.01)

(52) U.S. Cl.
CPC ... *H01M 2/0275* (2013.01); *Y10T 428/24331* (2015.01); *Y10T 428/24612* (2015.01); *Y10T 428/28* (2015.01); *Y10T 428/2852* (2015.01); *Y10T 428/2891* (2015.01)

(58) Field of Classification Search
CPC ............. H01M 2/0267; H01M 2/0275; H01M 2/0277; H01M 2/0285; H01M 2/0287; H01M 2/0292; Y10T 428/24331; Y10T 428/24612; Y10T 428/28; Y10T 428/2852
USPC .......................................... 429/185; 428/156
See application file for complete search history.

(56) References Cited

U.S. PATENT DOCUMENTS

| | | | |
|---|---|---|---|
| 3,216,024 A * | 11/1965 | Menhart | .......................... 2/274 |
| 6,280,322 B1 * | 8/2001 | Linden | .................. B41M 5/124 |
| | | | 462/18 |
| 2002/0005457 A1 * | 1/2002 | Lee et al. | ........................ 244/30 |
| 2009/0202773 A1 * | 8/2009 | Burgoon | ..................... 428/42.2 |
| 2010/0108250 A1 * | 5/2010 | Boehler | ............ B65H 35/0033 |
| | | | 156/251 |

FOREIGN PATENT DOCUMENTS

| JP | 2002-317161 A | | 10/2002 |
|---|---|---|---|
| JP | 2002317161 A | * | 10/2002 |
| JP | 2007-265879 A | | 10/2007 |

(Continued)

OTHER PUBLICATIONS

Korean Office Action (Notice of Allowance) dated Jul. 9, 2012 for the corresponding Korean Priority Application No. 10-2009-0116673—1 page.

(Continued)

*Primary Examiner* — Miriam Stagg
*Assistant Examiner* — Brent C Thomas
(74) *Attorney, Agent, or Firm* — Knobbe, Martens, Olson & Bear LLP

(57) ABSTRACT

A protection tape for sealing a sealing portion of a flexible outer casing of a secondary battery includes a base material having a predetermined width and a length larger than the width. An adhesive layer is formed on the base material. A bending portion is formed along a length direction of the base material on one surface of the base material. The bending portion is bent at the joint portion. Multiple knife marks or grooves are formed at the bending portion.

10 Claims, 8 Drawing Sheets

(56) References Cited

FOREIGN PATENT DOCUMENTS

| | | | |
|---|---|---|---|
| JP | 2007265879 A | * | 10/2007 |
| KR | 10-2001-0104136 A | | 11/2001 |
| KR | 10-2004-0107868 A | | 12/2004 |
| KR | 10-2005-0066120 A | | 6/2005 |
| KR | 10-2006-0001447 A | | 1/2006 |
| KR | 10-2008-0082724 A | | 9/2008 |
| WO | WO 9402091 A1 | * | 2/1994 |

OTHER PUBLICATIONS

Korean Office Action dated Oct. 11, 2011 for the corresponding Korean Priority Application No. 10-2009-0116673—5 pages.

* cited by examiner

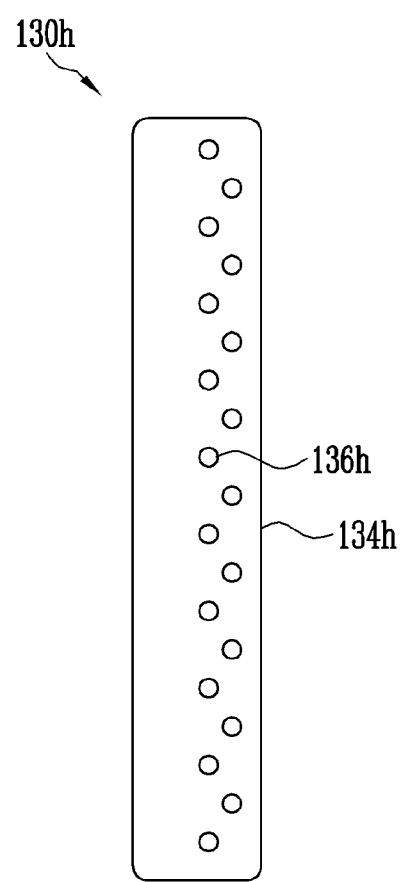

PROTECTION TAPE AND SECONDARY BATTERY HAVING THE SAME

CROSS-REFERENCE TO RELATED APPLICATION

This application claims the benefit of Korean Patent Application No. 10-2009-0116673, filed Nov. 30, 2009 in the Korean Intellectual Property Office, the disclosure of which is incorporated herein by reference.

BACKGROUND

1. Field

An aspect of the present invention relates to a protection tape for sealing a sealing portion of a flexible outer casing and a secondary battery having the protection tape.

2. Description of the Related Art

In general, a lithium polymer battery is a representative secondary battery using a flexible outer casing. The lithium polymer battery refers to a battery in which a separator is interposed between positive and negative electrode plates. Hereinafter, a stacked structure of the positive and negative electrode plates and the separator is referred to as an electrode assembly. The separator performs not only the function of separating the positive and negative electrode plates from each other but also the function of a medium (i.e., an electrolyte). The separator is formed of a gel-type polymer electrolyte. The separator may be prepared in the state that a polymer is impregnated with an electrolyte so as to enhance ion conductivity.

A pouch is used as a representative flexible outer casing. After the pouch is disposed to surround an electrode assembly, its edge may be sealed using a method such as hot press. By using a flexible outer casing, the thickness of a secondary battery may be remarkably decreased as compared with that of a secondary battery using a metal can. However, the size of an electrode assembly in the same volume may be increased. That is, the capacity of a secondary battery per unit volume may be increased.

SUMMARY

In one embodiment, there is provided a protection tape capable of enhancing the sealing performance and sealing process performance for a sealing portion of a flexible outer casing having an electrode assembly accommodated therein (i.e., a wing portion).

In another embodiment, there is provided a secondary battery which has the aforementioned protection tape, thereby improving its stability and reliability.

According to an aspect of the present invention, in a secondary battery having an electrode assembly and a flexible outer casing for accommodating the electrode assembly, there is provided a protection tape for sealing a joint portion of the outer casing, which includes a base material having a predetermined width and a length larger than the width; an adhesive layer formed on the base material; and a bending portion formed along a length direction of the base material on one surface of the base material, the bending portion being bent at the joint portion.

In one embodiment, the bending portion has a plurality of knife marks or grooves formed by blades.

In one embodiment, the bending portion has a dotted line shape in which the grooves are spaced apart from one another in the length direction.

In one embodiment, the bending portion has a plurality of dotted line shapes extending in parallel with one another in the length direction.

In one embodiment, the knife marks include lattice patterns.

In one embodiment, the grooves have a shape in which diagonal patterns are disposed in the length direction while being spaced apart from one another.

In one embodiment, the grooves have a shape in which V-shaped patterns are disposed in the length direction while being spaced apart from one another.

In one embodiment, the gap between adjacent grooves respectively positioned at both end portions in the length direction of the base material is narrow than the gap between adjacent grooves positioned at a central portion in the length direction of the base material.

In one embodiment, the grooves are formed in the shape of a dotted line having circular or elliptical dots spaced apart from one another in the length direction.

In one embodiment, the adhesive layer covers the bending portion.

In one embodiment, the adhesive layer has an opening to the bending portion.

In one embodiment, the adhesive layer any one of an adhesive agent containing silicon, an adhesive agent containing acryl and combination thereof.

According to another aspect of the present invention, there is provided a secondary battery including an electrode assembly having a stacked structure of a positive electrode plate, a separator and a negative electrode plate, and positive and negative electrode tabs respectively connected to the positive and negative electrode plates; a flexible outer casing having an edge joined by accommodating the electrode assembly in the two electrode tabs are extracted to the exterior thereof; and a protection tape attached to a joint portion of the flexible outer casing. Here, the protection tape includes a base material having a predetermined width and a length larger than the width; an adhesive layer formed on the base material; and a bending portion formed along a length direction of the base material on one surface of the base material, the bending portion being bent at the joint portion.

In one embodiment, the protection tape includes a protection tape according to the aforementioned aspect.

In one embodiment, an outer layer of the flexible outer casing any one of nylon, poly ethylene terephthalate (PET) and combination thereof.

According to an embodiment of the present invention, in a pouch type secondary battery, it is possible to enhance sealing performance for a wing portion (sealing portion) of a flexible outer casing in a bare cell. Further, the sealing performance can be easily maintained even when the width or thickness of the wing portion of the outer casing is not equal. Furthermore, a protection tape having a high sealing performance is attached to the wing portion of the outer casing, thereby enhancing the stability and reliability of the pouch type secondary battery.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 8A to 8D are plan views of protection tapes according to still another embodiments of the present invention.

DETAILED DESCRIPTION

Figure 1:
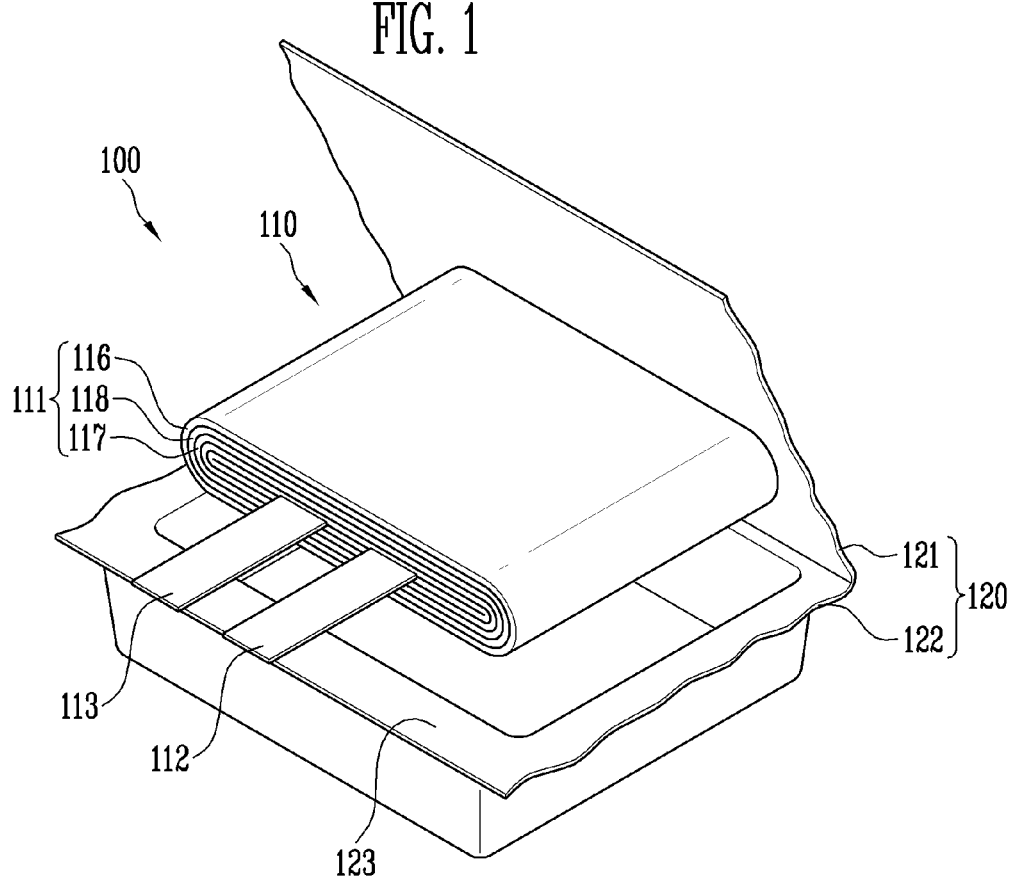
FIGS. 1, 2A and 2B are perspective views of pouch type secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
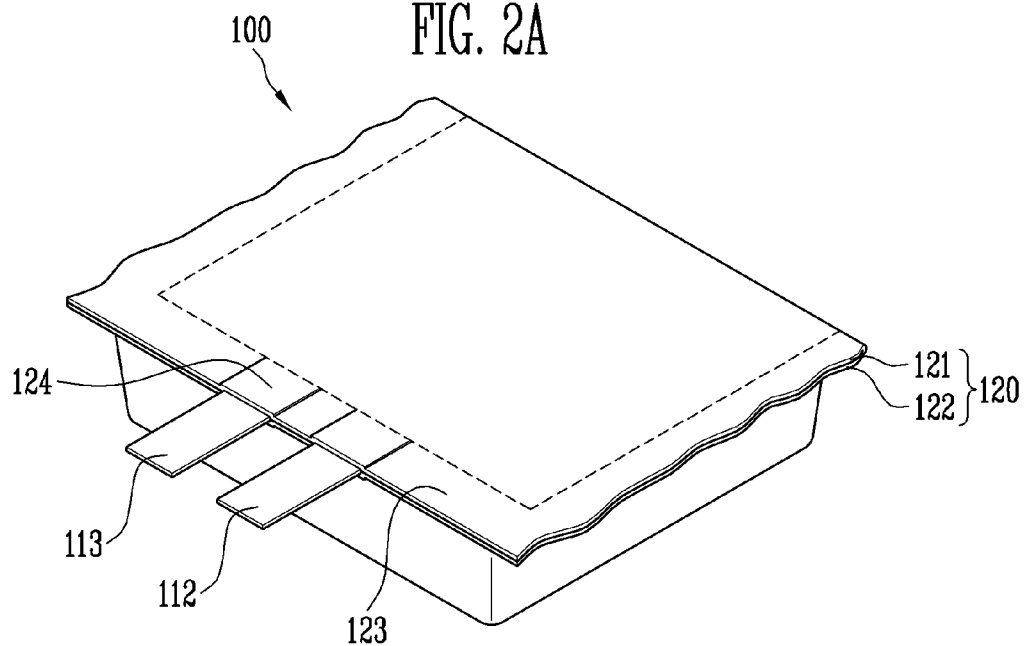
Figure 2B:
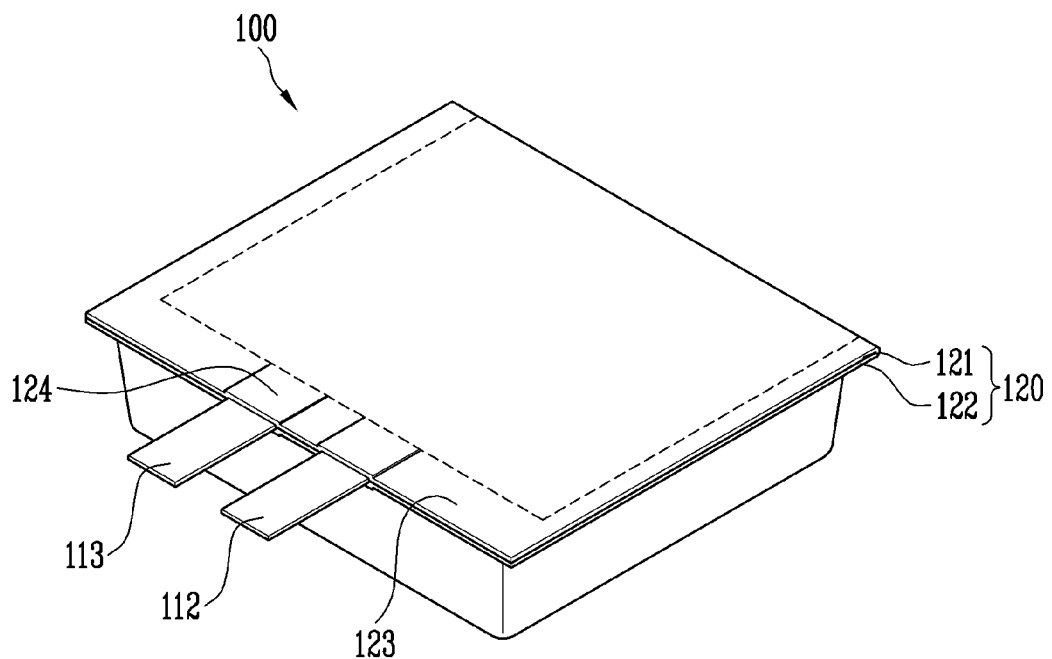

FIGS. 1, 2A and 2B are perspective views of a pouch type secondary battery 100 according to an embodiment of the present invention. Referring to FIG. 1, the pouch type secondary battery 100 includes an electrode assembly 110 and a flexible outer casing 120 that accommodates the electrode assembly 110 and is then sealed. The electrode assembly 110 includes a battery portion 111 and positive and negative electrode tabs 112 and 113 respectively connected to two electrodes of the battery portion 111.

The battery portion 111 has a positive electrode plate 116, a negative electrode plate 117 and a separator 118 interposed between the positive and negative electrode plates 116 and 117. The battery portion 111 may be manufactured by interposing the separator 118 between the positive and negative electrode plates 116 and 117 and then winding the combination, but the invention is not limited thereto. The separator is formed of a gel-type polymer electrolyte. The separator 118 may be a polymer is impregnated with an electrolyte so as to enhance ion conductivity, but the invention is not limited thereto such that the electrolyte can also be a liquid electrolyte.

The positive electrode plate 116 is connected to the positive electrode tab 112, and the negative electrode plate 117 is connected to the negative electrode tab 113. The positive and negative electrode tabs 112 and 113 may be may be packaged with a protection tape (not shown) so as to be isolated from the outer casing 120, but the invention is not limited thereto and other mechanisms can be used to electrically isolate the electrode tabs 112 and 113 from the outer casing 120.

The outer casing 120 includes a pouch packaging material. For example and without limitation thereto, the outer casing 120 can have one or more polymer films covering a metal foil. In one embodiment, an outer layer of the outer casing 120 is the metal foil and may be formed of aluminum. In another embodiment, the outer layer of the outer casing 120 is the polymer film and may include any one of nylon, poly ethylene terephthalate (PET) and combination thereof. The polymer film constituting an inner layer of the outer casing 120 protects the metal foil against an electrolyte and prevents short circuits between the positive and negative electrode plates and the electrode tabs.

The shown outer casing 120 includes a lower outer casing 122 and an upper outer casing 121. The lower outer casing 122 accommodates the battery portion 111. The upper outer casing 121 covers the top of the lower outer casing 122. In this embodiment, the upper and lower outer casings 121 and 122 are formed so that edges of three sides of the upper outer casing 121 are joined with edges of three sides of the lower outer casing 122, respectively, while the fourth side is a bending portion of the pouch packaging material. The joined edges on the three sides constitute sealing portions 123.

As illustrated in FIGS. 2A and 2B, the sealing portions 123 of the upper and lower outer cases 121 and 122 may be appropriately cut away so that the width of a portion of the edge (referred to as a wing portion) of the outer casing 120 is not too wide. The width of the wing portions of the outer casing 120 may be, for example, about 1.5 to 2.0 mm depending on the size of the battery 100. The sealing portions 123 respectively positioned at three edges of the outer casing 120 are sealed by a predetermined sealing pressure. Hereinafter, the electrode assembly 110 packaged by the flexible outer casing 120 is referred to as a bare cell.

Figure 3:
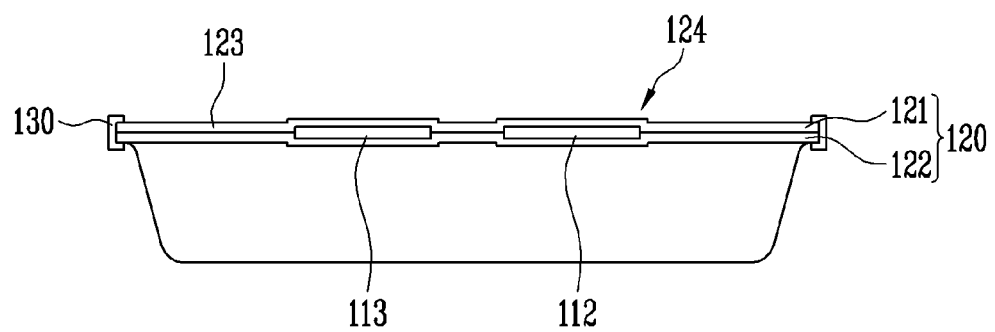
FIG. 3 is a front view illustrating a protection tape applied to the pouch type secondary battery of FIG. 2B.

FIG. 3 is a front view illustrating a protection tape applied to the pouch type secondary battery 100 of FIG. 2B. Referring to FIG. 3, a protection tape 130 is provided to enhance the sealing stability of the sealing portions 123 of the outer casing 120. The protection tape 130 may be applied to any one of the first, second and third wing portions. Here, the first wing portion has the electrode tabs 112 and 113 extending therefrom. The second and third wing portions are adjacent to both ends of the first wing portion, respectively.

In the shown embodiment, the protection tape 130 is applied to seal the sealing portions 123 of the second and third wing portions. The protection tape 130 is formed to extend in an approximately 'U' shape to the wing portions of the lower outer casing 122 via an outer surface of the wing portions of the upper outer casing 121. There is no protection tape 130 on the first wing portion.

The protection tape 130 of this embodiment maintains the sealing state of the sealing portions 123 of the bare cell to be satisfactory. The protection tape 130 is provided with at least one bending line or bending portion so that the sealing portions 123 do not easily come off even when the width of the sealing portions 123 is narrowed or unequal.

Meanwhile, if the sealing portions 123 of the bare cell is sealed using a protection tape with no bending portion, the protection tape may easily come off at the sealing portions 123. When the width of the sealing portions of the bare cell is narrowed or unequal due to the tendency that the size of batteries is miniaturized, the coming-off phenomenon may become serious.

However, the protection tape 130 of this embodiment is provided with at least one bending portion, so that it is possible to prevent the protection tape 130 from coming off at the sealing portions 123 when the width of the sealing portions 123 of the bare cell is narrowed or unequal. The protection tape 130 of this embodiment will be in a more detailed manner below.

Figure 4A:
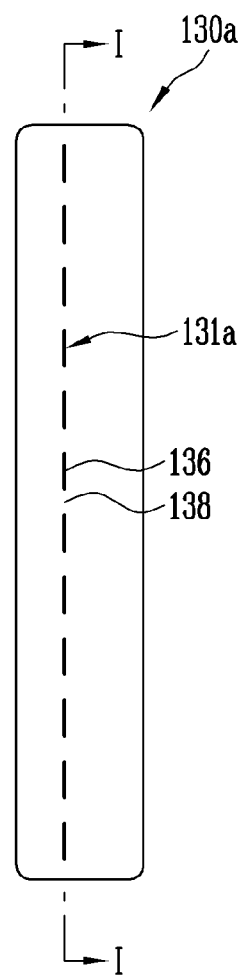
FIG. 4A is a plan view of a protection tape according to an embodiment of the present invention.
Figure 4B:
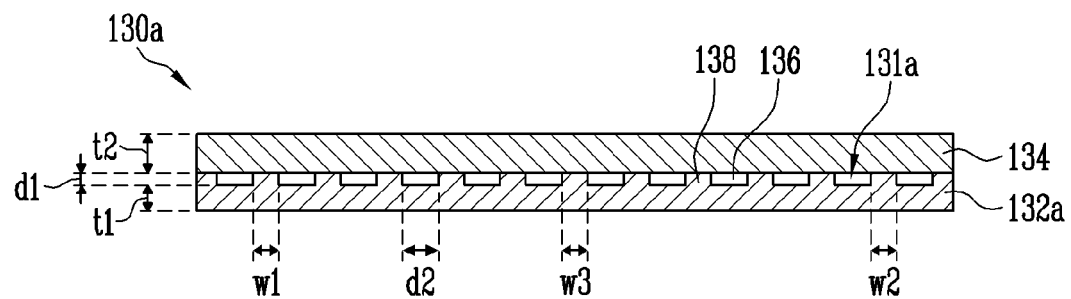
FIG. 4B is a sectional view taken along line I-I of the protection tape in FIG. 4A.

FIG. 4A is a plan view of the protection tape 130*a* according to an embodiment of the present invention. FIG. 4B is a sectional view taken along line I-I of the protection tape 130*a* in FIG. 4A. Referring to FIGS. 4A and 4B, the protection tape 130*a* of this embodiment includes a base material 132*a* and an adhesive layer 134 disposed on one surface of the base material 132*a*. A bending portion 131*a* is formed at the one surface of the base material 132*a*. A release paper (not shown) may be additionally formed on the adhesive layer 134 and covers the adhesive layer 134 prior to use. The release paper may be formed with paper or film and is removable when the layer 134 is adhered to a wing.

The base material 132*a* has a predetermined width and a length larger than the width. For example, the base material 132*a* may be made of a conductive or insulative fiber, a metal foil or the like. For example, the base material 132*a* may include any one of metal plated polyester, general polyester, aluminum (Al) foil, copper foil and the like. The length of the base material 132*a* generally corresponds to a length of the sealing portion 123 to which the protection tape 130*a* is attached. The width of the base material 132*a* generally corresponds at least a height of the sealing portion 123 about which the protection tape 130*a* bends and a portion of opposing sides of the sealing portions 123.

The adhesive layer 134 may be coated on one or both surfaces of the base material 132*a*. For example, an adhesive agent containing silicon or an adhesive agent containing acryl may be used as the adhesive layer 134. If the adhesive agent containing silicon is used as the adhesive layer 134, it has a property that its adhesive strength is gradually increased, and hence, it is easy to use the adhesive agent. The adhesion of the adhesive layer 134 may have, for example, a range of about 700 to 2000 g/25 mm when it is measured using a predetermined method, e.g., the ASTM D 3330 method.

The first thickness t1 of the base material 132*a* and the second thickness t2 of the adhesive layer 134 may be appropriately adjusted based on their materials, respectively. For example, the sum of the first and second thicknesses t1 and t2 may be about 0.03±0.005 mm to 0.11±0.01 mm.

In this embodiment, the bending portion 131*a* is covered by the adhesive layer 134. The bending portion 131*a* may be formed using incisions or cuts disposed in a dotted line shape or as a stripe shape. The bending portion 131*a* has a shape in which a plurality of grooves 136 extends in one direction while being spaced apart from one another at a predetermined gap 138. For example, the bent portion 131*a* may have the shape of marks formed by chopping one surface of the base material 132*a* using a device provided with a plurality of blades. These incisions weaken the cut portion of the base material 132*a* thereby enhancing the bending at the grooves 136 relative to the remainder of the base material 132*a*. While shown off center, it is understood that grooves 136 can be disposed at a center of the base material 132*a*.

The depth d1 of the bent portion 131*a* and the length d2 of the grooves 136 may be adjusted in an appropriate range, considering the enhanced sealing performance and durability of the protection tape 13*a*. For example, the depth d1 of the bending portion 131*a* may be about 0.005 to 0.01 mm, and the length d2 of the grooves 136 may be about 0.5 mm.

The enhanced sealing performance indicates a degree at which when the protection tape 130*a* of this embodiment is attached to a sealing portion of a bare cell, the tape 130*a* maintains the state well attached to the sealing portions by the bending portion 131*a* even at the narrow width and unequal edge of the sealing portion. The durability indicates a degree at which the protection tape 130*a* having the bending portion 131*a* is not easily torn.

In a modification of this embodiment, the arrangement of the grooves 136 of the bending portion 131*a* is adjusted, thereby enhancing sealing performance and sealing process performance. More specifically, it is assumed that the lengths d2 of the grooves 136 are the same and that the length of the protection tape 130*a* corresponds to the length of one sealing portion 131*a* of the bare cell. Then, the third gap w3 between grooves 136 positioned at a central portion in the length direction of the protection tape 130*a* is wider than the first gap w1 between grooves 136 positioned at one end portion in the length direction of the protection tape 130*a* or the second gap w2 between grooves 136 positioned at the other end portion in the length direction of the protection tape 130*a*.

As described above, if each of the gaps w1 and w2 between grooves 136 positioned at both end portions in the length direction of the protection tape 130*a* is narrower than the gap w3 between grooves 136 positioned at the central portion in the length direction of the protection tape 130*a*, it is possible to effectively prevent the protection tape 130*a* from being easily lifted or separated from the both end portions in the length direction of the sealing portion.

Figure 5A:
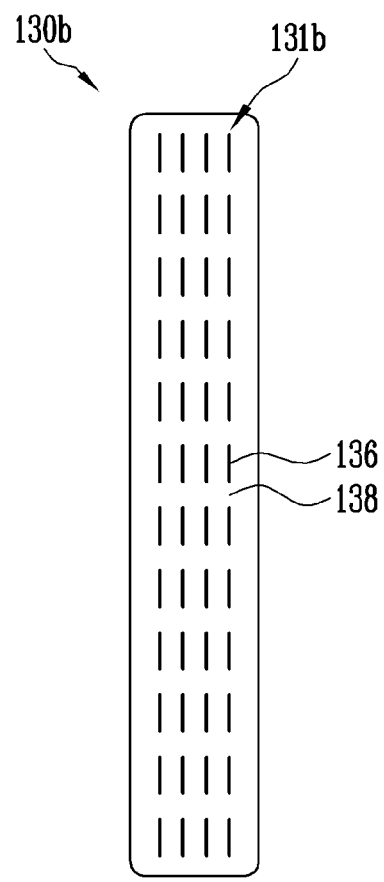
FIG. 5A is a plan view of a protection tape according to another embodiment of the present invention.
Figure 5B:
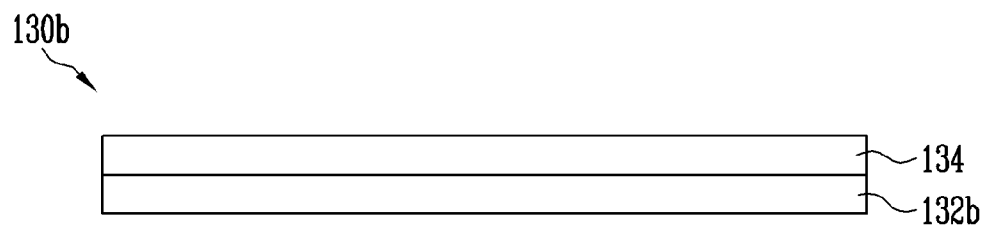
FIG. 5B is a right side view of the protection tape of FIG. 5A, rotated by 90 degrees.

FIG. 5A is a plan view of a protection tape 130*b* according to another embodiment of the present invention. FIG. 5B is a right side view of the protection tape 130*b* of FIG. 5A, rotated by 90 degrees. Referring to FIGS. 5A and 5B, the protection tape 130*b* includes a base material 132*b* and an adhesive layer 134 formed on one surface of the base material 132*b*. A stripe-shaped bending portion 131*b* is formed on one surface of the base material 132*b*. In this embodiment, the bending portion 131*b* has a shape in which a plurality of dotted lines extends in one direction while being spaced apart from one another at a predetermined gap. According to such a configuration, when the protection tape 130*b* is attached to a sealing portion of a bare cell, the attachment state to the sealing portion can be stably maintained by a plurality of bending lines even when the tape 130*b* is twisted due to the narrow width and unequal edge of the sealing portion.

The protection tape 130*b* of this embodiment is substantially identical to the protection tape 130*a* described with reference to FIGS. 4A and 4B, except the configuration and operational effect of the bending portion 131*b* having the plurality of dotted lines disposed on the one surface of the base material 132*b*.

Figure 6A:
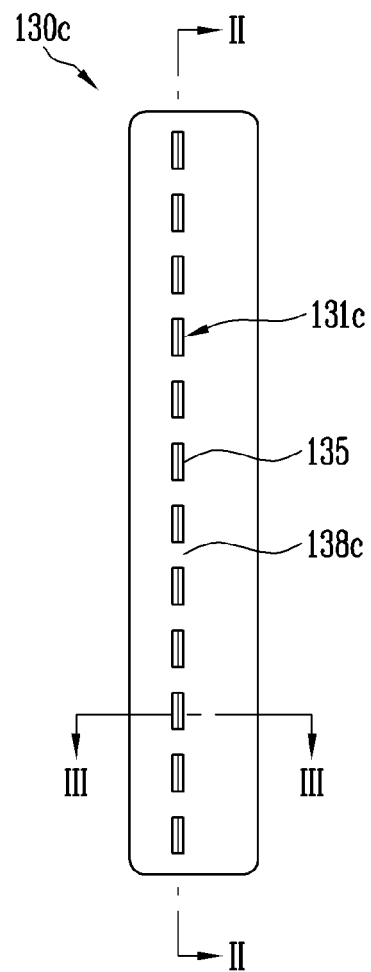
FIG. 6A is a plan view of a protection tape according to still another embodiment of the present invention.
Figure 6B:
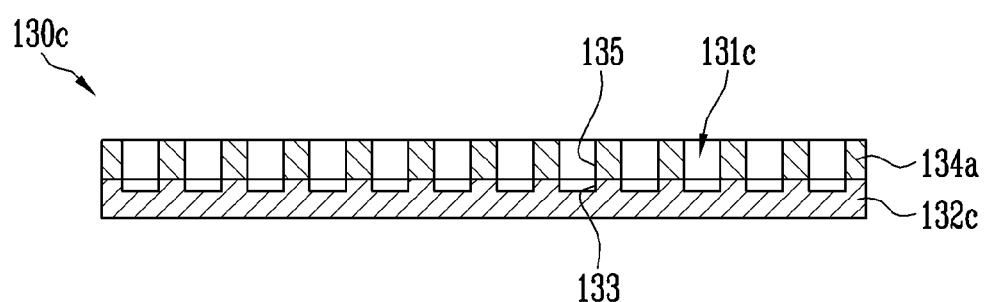
FIG. 6B is a sectional view taken along line II-II of the protection tape in FIG. 6A.
Figure 6C:
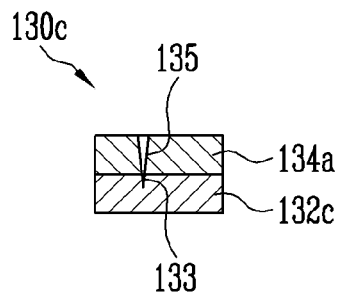
FIG. 6C is a sectional view taken along line III-III of the protection tape in FIG. 6A.

FIG. 6A is a plan view of a protection tape 130*c* according to still another embodiment of the present invention. FIG. 6B is a sectional view taken along line II-II of the protection tape 130*c* in FIG. 6A. FIG. 6C is a sectional view taken along line III-III of the protection tape 130*c* in FIG. 6A. Referring to FIGS. 6A and 6B, the protection tape 130*c* includes a base material 132*c* and an adhesive layer 134*a* formed on one surface of the base material 132*c*. A bending portion 131*c* is formed on the base material 132*c*. A release paper (not shown) may be additionally formed on the adhesive layer 134*a*.

In this embodiment, the bending portion 131*c* has grooves 133 formed on the one surface of the base material 132*c* and openings 135 formed in the adhesive layer 134*a* to correspond to the grooves 133. The shown bent portion 131*c* has a single stripe shape (e.g., a dotted line shape). For example, the bending portion 131*c* has a shape in which the plurality of grooves 133 and/or the plurality of openings 135 extend in one direction while being spaced apart from one another at a predetermined gap 138*c*. The openings 135 and grooves 133 of the bending portion 131c may have the shape of marks formed by chopping one surface of the protection tape 130c using a device provided with a plurality of blades (see FIG. 6C).

The depth of the bending portion 131c and the length of the grooves or openings 133 or 135 may be adjusted in an appropriate range, considering the enhanced sealing performance and durability of the protection tape 130c.

In a modification of this embodiment, the arrangement of the grooves 133 and the openings 135 corresponding to the grooves 133 in the bending portion 131c is adjusted, thereby increasing enhanced sealing performance. More specifically, it is assumed that the lengths of the openings 135 in the length direction of the protection tape 130c are the same and that the length of the protection tape 130c corresponds to the length of one sealing portion of a bare cell. Then, the gap between grooves 133 positioned adjacent to both end portions in the length direction of the protection tape 130c is narrower than the gap 138c between grooves 133 positioned at a central portion in the length direction of the protection tape 130c. According to such a configuration, it is possible to effectively prevent the protection tape 130c from being easily lifted or separated from both end portions in the length direction of the sealing portion.

Figure 7:
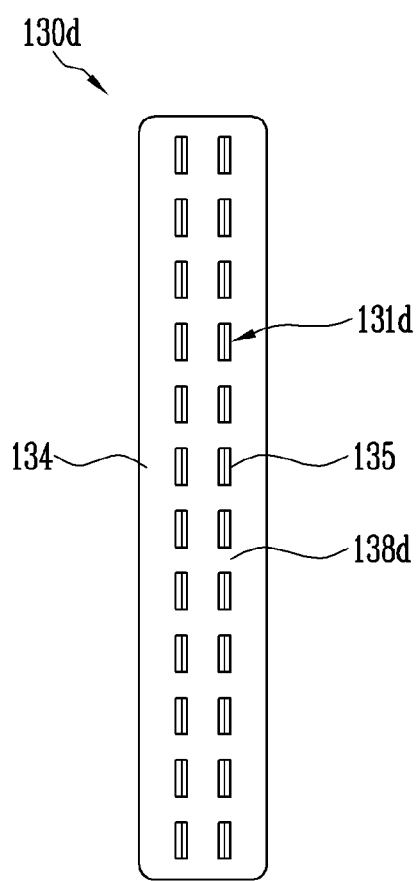
FIG. 7 is a plan view of a protection tape according to still another embodiment of the present invention.

FIG. 7 is a plan view of a protection tape 130d according to still another embodiment of the present invention. Referring to FIG. 7, the protection tape 130d includes a base material (not shown) and an adhesive layer 134 formed on one surface of the base material. A stripe-shaped bending portion 131d is formed on the one surface of the base material.

In this embodiment, the bending portion 131d has a plurality of dotted line shapes in which a plurality of openings 135 extend in one direction while being spaced apart from one another at a predetermined gap 138d. According to such a configuration, when the protection tape 130d is attached to a sealing portion of a bare cell, the attachment state to the sealing portion can be stably maintained by the bending portion 131d having the plurality of dotted line shapes even when it is twisted due to the narrow width and unequal edge of the sealing portion.

The protection tape 130d of this embodiment is substantially identical to the protection tape 130c described with reference to FIGS. 6A to 6C, except the configuration and operational effect of the bending portion 131d having the plurality of dotted line shapes, disposed on the one surface of the base material.

Figure 8A:
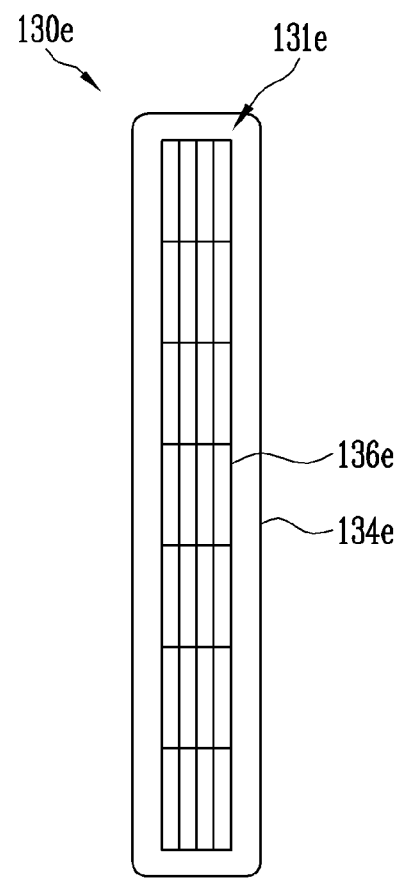

FIGS. 8A to 8D are plan views of protection tapes 130e 130f, 130g, 130h according to still another embodiments of the present invention. Referring to FIG. 8A, the protection tape 130e of one embodiment includes a base material, or a base material and a bending portion 131e having a shape in which lattice patterns or lattice-shaped knife marks or grooves 136e are disposed to extend in the length direction of the protection tape 130e in an adhesive layer 134e on the base material.

Figure 8B:
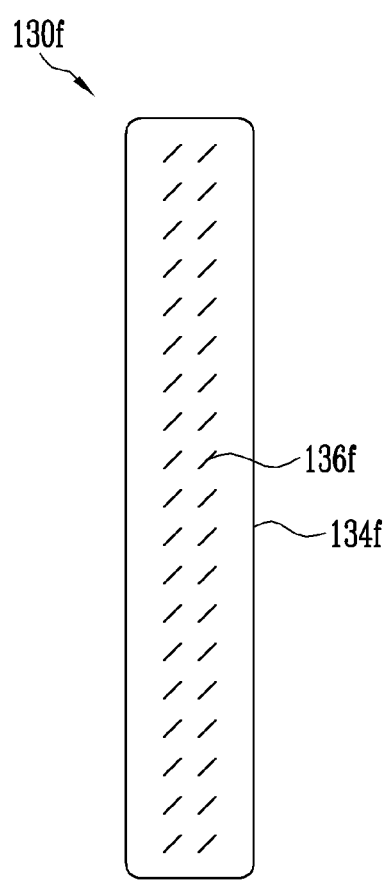

Referring to FIG. 8B, the protection tape 130f of one embodiment includes a base material, or a base material and a bending portion having a shape in which diagonal patterns or diagonal-shaped marks or grooves 136f are disposed to extend in the length direction of the protection tape 130f in an adhesive layer 134f on the base material.

Figure 8C:
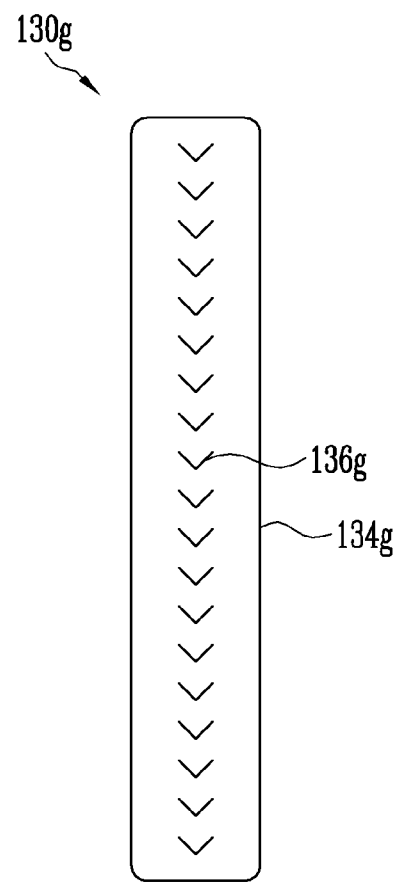

Referring to FIG. 8C, the protection tape 130g of one embodiment includes a base material, or a base material and a bending portion having a shape in which V-shaped knife marks or grooves 136g extend in the length direction of the protection tape 130g while being spaced apart from one another in an adhesive layer 134g on the base material.

Referring to FIG. 8D, the protection tape 130h of one embodiment includes a base material, or a base material and a bending portion having a shape in which circular or elliptical knife marks or grooves 136h extend in the length of the protection tape 130h while being spaced apart from one another in an adhesive layer 134h on the base material.

According to the aforementioned protection tapes 130e, 130f, 130g and 130h, the bending effect of the protection tape can be increased at a joint portion of a flexible outer casing, corresponding to an unequal bending surface of the flexible outer case. Further, it is possible to prevent the protection tape from being continuously separated from the joint portion by an undesired change in environment after the protection tape is attached to the joint portion of the flexible outer case.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A protection tape for sealing a joint portion of a flexible outer casing of a secondary battery having an electrode assembly and the flexible outer casing for accommodating the electrode assembly and which is sealed at a joint portion, the protection tape comprising:
    a base having a predetermined width in a width direction and a length longer than the width in a length direction;
    an adhesive layer on the base; and
    a plurality of discrete notches formed in the base and in the adhesive layer of the protection tape,
    wherein the notches extend completely through the adhesive layer in a layer depth direction of the adhesive layer and further extend partially through the base in the layer depth direction,
    wherein the notches form at least one folding line along the length direction such that the protection tape is prone to fold along the at least one folding line,
    wherein each discrete notch is also elongated along the length direction,
    wherein the notches form a plurality of dotted lines extending in parallel with one another in the length direction,
    wherein the notches of each of the dotted lines are spaced apart from one another along the length direction such that immediately neighboring discrete notches in each of the dotted lines are separated from each other,
    wherein the protection tape is divided by the notches into a first unpatterned portion and a second unpatterned portion each extending in the width direction from the line of notches to a respective outer edge of the protection tape, such that the first unpatterned portion and the second unpatterned portion at least partially overlap each other when the protection tape is folded along the folding line, and
    wherein the protection tape has a first side and a second side,
    wherein the adhesive layer and the notches are formed only on the first side of the protection tape, and
    wherein a gap between immediately adjacent notches positioned at each of end portions of the tape along the length direction is narrower than a gap between immediately adjacent notches positioned at a central portion of the tape between the end portions along the length direction.

2. The protection tape according to claim 1, wherein the notches form a lattice pattern.

3. The protection tape according to claim 1, wherein each notch is a diagonal notch extending in a diagonal direction, wherein the diagonal notches form a line extending in the length direction while being spaced apart from one another.

4. The protection tape according to claim 1, wherein each notch is a V-shaped notch, wherein the V-shaped notches form a line extending in the length direction while being spaced apart from one another.

5. The protection tape according to claim 1, wherein each notch is one of a circular notch or an elliptical notch spaced apart from one another in the length direction.

6. The protection tape according to claim 1, wherein the adhesive layer comprises an adhesive agent containing silicon and/or an adhesive agent containing acryl.

7. A secondary battery comprising:
an electrode assembly comprising a positive electrode plate, a negative electrode plate, a separator disposed between the positive and negative electrode plates, a positive electrode tab connected to the positive electrode plate, and a negative electrode tab connected to the negative electrode plate;
a flexible outer casing accommodating the electrode assembly and having a joint portion along which a first edge portion and a second edge portion of the outer casing are combined, the positive and negative electrode tabs extending through the flexible outer casing to the exterior thereof; and
a protection tape attached to the joint portion of the flexible outer casing, the protection tape comprising:
a base having a predetermined width in a width direction and a length in a length direction longer than the width,
an adhesive layer on the base, and
a plurality of discrete notches formed in the base and in the adhesive layer of the protection tape,
wherein the notches extend completely through the adhesive layer in a layer depth direction of the adhesive layer and further extend partially through the base in the layer depth direction,
wherein the notches form at least one folding line along the length direction such that the protection tape is prone to fold along the at least one folding line,
wherein each discrete notch is also elongated along the length direction,
wherein the protection tape is divided by the notches into a first unpatterned portion and a second unpatterned portion each extending in the width direction from the line of notches to a respective outer edge of the protection tape, such that the first unpatterned portion and the second unpatterned portion at least partially overlap each other when the protection tape is folded along the folding line, and
wherein two immediately neighboring discrete notches are separated from each other,
wherein the protection tape has a first side and a second side,
wherein the adhesive layer and the notches are formed only on the first side of the protection tape, and
wherein the notches form a plurality of dotted lines extending in parallel with one another in the length direction, and wherein a gap between immediately adjacent notches positioned at each of end portions of the tape along the length direction is narrower than a gap between immediately adjacent notches positioned at a central portion of the tape between the end portions along the length direction.

8. The secondary battery according to claim 7, wherein the adhesive layer comprises adhesive agent containing silicon and/or an adhesive agent containing acryl.

9. The secondary battery according to claim 7, wherein an outer layer of the flexible outer casing comprises nylon and/or poly ethylene terephthalate (PET).

10. The protection tape according to claim 1, wherein portions of the notches extending through the adhesive layer and corresponding portions of the notches extending partially through the base have the same shape and size in the width direction and in the length direction.

* * * * *